March 17, 1959     J. PAVELKA, JR     2,877,703
ELECTRIC WAFFLE BAKER
Filed Oct. 18, 1954
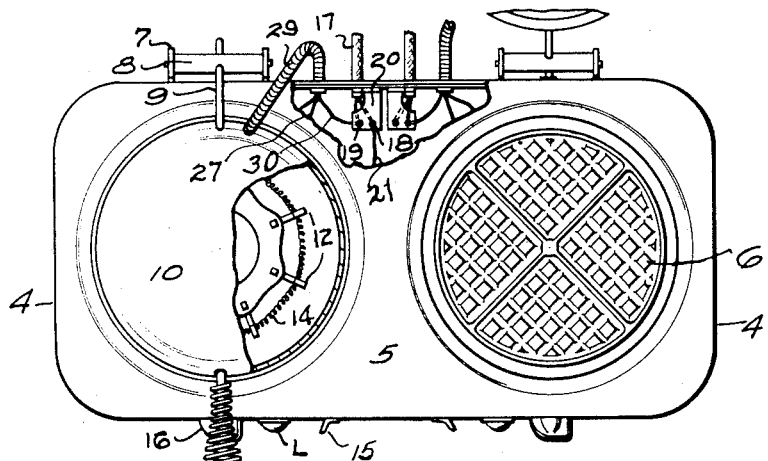
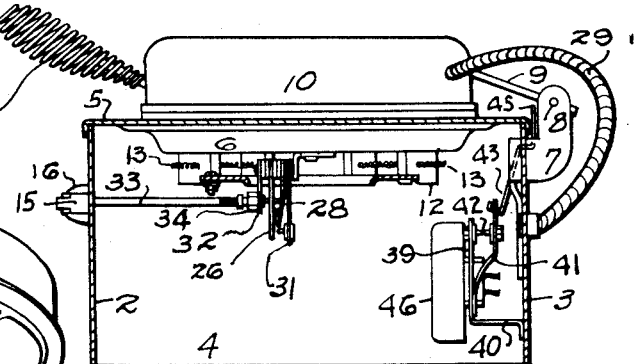
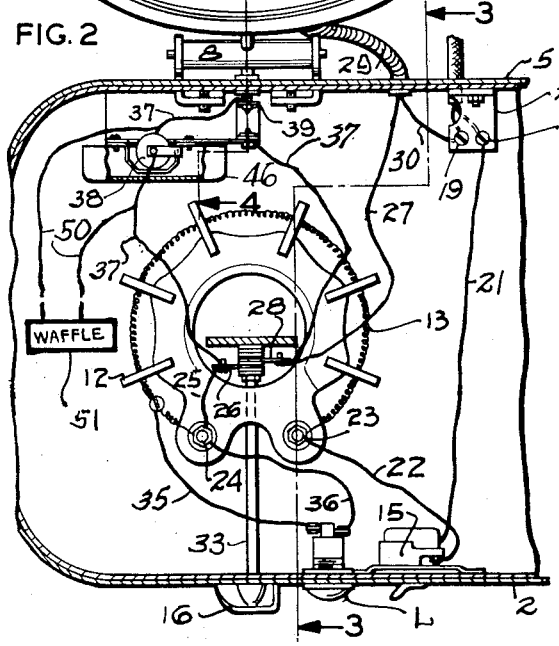

United States Patent Office 2,877,703
Patented Mar. 17, 1959

2,877,703

ELECTRIC WAFFLE BAKER

Joseph Pavelka, Jr., St. Louis, Mo.

Application October 18, 1954, Serial No. 462,852

1 Claim. (Cl. 99—331)

The invention relates to electric cooking appliances, such as waffle bakers, sandwich grills or the like, in which timing of the cooking operation is desirable.

One of the objects of the invention is to control the cooking period automatically but without requiring a clock mechanism and attention to such a mechanism by the user.

Another object is to provide visible and audible signal devices indicating when a cooking operation is finished. Preferably the appliance will include a thermostatic switch for maintaining a desired temperature throughout cooking and even afterwards, but it is undesirable to have certain signal devices operate intermittently while the device is maintaining the cooked material hot, due to opening and closing of a circuit by the thermostatic switch, and it is a further object of the invention to provide for a single signal when the food is cooked, which upon attention by the user will not function again until a subsequent cooking operation is effected.

The accompanying drawings illustrate the invention embodied in a double waffle iron adapted either for domestic or commercial use and in these drawings Figure 1 is a top view of the waffle baker with the upper portion removed in part and the lower portion sectioned horizontally in part to better illustrate the construction.

Figure 2 is a top view of the left hand end of the waffle baker shown in Figure 1, with the top grid raised and the lower grid removed to illustrate the wiring and other parts beneath the grids.

Figure 3 is a vertical transverse section taken on the line 3—3 of Figure 2.

Figure 4 is a vertical transverse section of the right hand part of Figure 3 but showing the parts in a different position.

The appliance includes a housing having a front wall 2, a rear wall 3, end walls 4 and a top wall 5. Lower cooking grids 6 are fixed in top wall 5 near opposite ends of the casing, and the parts associated with each grid 6 are duplicated for the other grid and the description of one set of parts only follows.

Upstanding brackets 7 on rear wall 3 journal a horizontal pintle 8. A rod 9 extends transversely through pintle 8 and mounts an upper cooking grid 10 having a heat-dissipating wire handle 11, whereby the upper grid may be swung from the lowered position shown in Figures 1 and 3, where it overlies grid 6, to the raised position shown in Figure 4. The rear face of each grid carries a series of insulators 12 mounting electric resisting heating elements 13 and 14, respectively.

Housing front wall 2 mounts an on-and-off switch 15, an indicator lamp L, and a temperature adjusting knob 16. Rear wall 3 is apertured for the passage therethrough of a current supply line 17 (Figure 1), the ends of the two wires of which are secured to posts 18 and 19, on a bracket 20 on the inner side of the rear wall. A wire 21 (Figure 2) leads from post 18 to one terminal of switch 15. A wire 22 extends from the other terminal of switch 15 to one post 23 of electric resistance heating element 13 mounted on the underside of the lower waffle iron. The other post 24 of heating element 13 is connected by a wire 25 to one blade 26 of a thermostatic switch (Figure 3). A wire 27 leads from the other blade 28 of the switch into a flexible conduit 29 extending from rear wall 3 rearwardly and upwardly and into the casing for upper waffle iron 10, where it is connected to one end of heater 14. The other end of heater 14 is connected by a wire 30 to the other post 19 on bracket 20.

The appliance is controlled manually by switch 15. After the switch is closed and a predetermined temperature surrounding the thermostatic switch 26, 28 is reached, a bi-metal 31 will be distorted to the left (Figure 3), moving blade 26 away from blade 28. The relation between bi-metal 31 and switch blade 26 is manually controlled by a shaft 33 extending inwardly from knob 16 with its inner end threaded into a stationary nut 34 on bracket 32 so that rotation of knob 16 and shaft 33 in one direction will move spring blade 26 away from blade 28 so as to control opening and closing of the circuit by bi-metal 31.

A shunt wire 35 (Figure 2) leads from a part of heater 13 spaced from post 24 to lamp L and a shunt wire 36 leads from lamp L to post 24. Whenever the grid heating element is energized, current will flow through shunt wires 35 and 36 to light lamp L.

A shunt circuit 37 leads from the mounting for blade 26 through a solenoid resistance coil 38 and then through switch blades 39 and 41 (Figures 3 and 4), mounted on a bracket 40 on the casing rear wall 3, to the mounting for thermostatic switch blade 28. Stationary blade 39 and movable blade 41 have co-operating contacts 42 at their upper ends. A link 43, hooked at its lower end to blade 41, is offset at 44 to pass through a slot in housing rear wall 3 and then extends upwardly at 45 into a position to be engaged by the lower end of rod 9 when grid 10 is raised to the position shown in Figure 4. Such engagement of the upper end 45 of the link shifts its lower end rearwardly of the casing to separate switch blades 39 and 41 and open contacts 42 so current does not go to solenoid coil 38, irrespective of whether the grid resistance heater circuit is open or closed.

Mounted on bracket 40 with switch blade 39 is a bell 46 having a striker 47 actuated by solenoid 38. When the upper grid 10 is lowered, the solenoid circuit is closed by switch 39, 41, 42, but the solenoid circuit is still subject to control by the thermostatic switch 26, 28. If switch 26, 28 is closed its circuit affords a better conductor for current than shunt circuit 37, because of the resistance of the solenoid coil, and the solenoid striker is not actuated.

When the waffle iron cord is connected and main switch 15 is turned on, current will flow to grid heating elements 13, 14, and pilot light L will be lit. When grid 6 reaches a predetermined temperature, bi-metal 31 will open switch 26 and 28, pilot light L will go out, thus giving a visual indication that the waffle is cooked. At the same time, since the circuit through switch 26, 28 is interrupted, the current overcomes the resistance of solenoid 38 and flows through wires 37, switch 39, 42, 41 and wires 27, 30, so as to energize the solenoid and actuate the striker 47, thus indicating audibly that the waffle is cooked. Elements 13, 14 continue to serve as nonresistance conductors for the reduced current passing through the solenoid but do not provide heat until the thermostat cools and closes switch 26, 28 and the current may pass through elements 13, 14 independently of the solenoid.

If the attendant ignores the darkened lamp and the bell signal, the subsequent cooling of the thermostat, closure of switch 26, 28, reheating of the grids, and resulting opening of the thermostatic switch 26, 28 will cause the bell to be rung again. This off and on action of the lamp and the sound of the bell will proceed intermittently until the attendant removes the waffle or raises the upper grid.

When the attendant raises the upper grid and thereby opens switch 39, 41, 42 in the circuit for solenoid 38, but does not remove the waffle, the thermostatic switch will open and close and the waffle will be kept hot, but the bell will not sound. However, an additional signal is afforded by wires 50, paralleling the two parts of wire 37, leading to a remote visible sign 51, which will be lit up when the waffle is finished, and the thermostatic switch is opened, so that an attendant or customer remote from the waffle iron may know that the waffle is ready. This sign is optional.

Summarizing the above detailed description: When the appliance is connected to a source of supply and its main switch 15 is turned on, it is always ready for immediate service as the grids will be maintained at the predetermined temperature by the thermostatic switch. When the operator places batter on the lower grid, the immediate drop in the temperature of the grid will result in closing of the thermostatic switch and the pilot lamp will light, indicating that the appliance is heating.

As soon as moisture is removed from the batter due to baking, the grids will reach the predetermined temperature at which the thermostat will automatically turn out the pilot lamp, the bell will ring, and the sign, if used, will go on to give notice audibly and visibly that the waffle is finished.

When the waffle is removed from the grid and the upper grid is left raised, heating elements will keep the grids at proper baking temperature without ringing the bell or lighting the sign, although the pilot lamp will go off and on with fluctuations in the temperature.

If a waffle is baking and the attendant does not remove the waffle when it is finished, or if he lowers the upper grid without placing batter on the lower grid, the bell and sign will go off and on intermittently each time the thermostat shifts. This will prompt the attendant to (a) remove the waffle, and (b) to keep the upper grid raised, if a successive waffle is not being cooked, so as to avoid further bell ringing. By leaving the grid up, when not cooking, there will be no evaporation of seasoning as would be the case if the grid were lowered.

Accordingly, it will be noted that the general objectives of the invention are attained by the structure illustrated, which may be varied in detail without departing from the spirit of the invention, as expressed in the accompanying claim.

What is claimed is:

In a waffle baker, a housing, a lower grid stationary in the housing, an upper grid hinged to the housing and movable to a position immediately over the lower grid and to a position inclined upwardly and rearwardly of the lower grid, an individual resistance heating element associated with each of said grids, a common circuit for energizing said heating elements, a thermostat-actuated switch in said circuit, a manually actuated switch in said circuit, a shunt circuit paralleling the heating element circuit and having a switch, a link connecting the latter-mentioned switch to the upper grid and closing the switch by the lowering of the upper grid and opening the switch by the raising of the upper grid, said shunt circuit being energized when its grid controlled switch is closed and said thermostat-actuated switch is opened, and a signal actuated by the energizing of said shunt circuit.

References Cited in the file of this patent
UNITED STATES PATENTS

| | | |
|---|---|---|
| 1,929,231 | Yirava | Oct. 3, 1933 |
| 1,957,343 | Hurxthal et al. | May 1, 1934 |
| 2,052,919 | Brogdon et al. | Sept. 1, 1936 |
| 2,180,233 | Graham | Nov. 14, 1939 |
| 2,237,147 | Ireland | Apr. 1, 1941 |
| 2,255,508 | Hall | Sept. 9, 1941 |
| 2,282,089 | Propernick | May 5, 1942 |
| 2,308,091 | McCullough | Jan. 12, 1943 |
| 2,342,077 | Jepson | Feb. 15, 1944 |
| 2,427,444 | Colombo | Sept. 16, 1947 |

FOREIGN PATENTS

| | | |
|---|---|---|
| 432,207 | Great Britain | July 23, 1935 |